Oct. 11, 1960     F. L. DAVIS     2,955,478
AUTOMOBILE GENERATOR DRIVE

Filed March 3, 1958     3 Sheets-Sheet 1

INVENTOR.
FREDERICK L. DAVIS
BY
ATTORNEYS

Oct. 11, 1960

F. L. DAVIS 2,955,478

AUTOMOBILE GENERATOR DRIVE

Filed March 3, 1958

INVENTOR.
FREDERICK L. DAVIS
BY Lyon & Lyon
ATTORNEYS

Oct. 11, 1960    F. L. DAVIS    2,955,478
AUTOMOBILE GENERATOR DRIVE

Filed March 3, 1958    3 Sheets-Sheet 3

INVENTOR.
FREDERICK L. DAVIS
BY
ATTORNEYS

United States Patent Office 2,955,478
Patented Oct. 11, 1960

2,955,478

AUTOMOBILE GENERATOR DRIVE

Frederick L. Davis, Fort Worth, Tex., assignor to Welex, Inc., Fort Worth, Tex., a corporation of Delaware Filed Mar. 3, 1958, Ser. No. 718,743

5 Claims. (Cl. 74—336)

This invention relates to an automobile generator drive and is an improvement in the invention disclosed in my prior Reissue Patent Re. 24,309, entitled "Automobile Generator Driving Means," reissued April 23, 1957, the original patent being U.S. Patent No. 2,694,175, dated November 9, 1954.

Objects of the present invention include those set forth in my aforementioned reissue patent, namely, to provide a mechanism for application to the conventional automobile generator whereby, when the vehicle motor is moving at low or idling speeds, the generator will be accelerated to normal speed to furnish the current drawn from it at normal speeds, so that under all conditions of operation of the vehicle, the generator will be working at its normal speed to supply all the electrical equipment, thus relieving the battery of the drain that would otherwise be imposed upon it; to provide a mechanism of this kind which may be applied to any motor vehicle without modification of the equipment of the latter; and to relieve the automobile battery of the drain on it that normally occurs when the vehicle engine or motor is idling or turning at low speeds.

In addition to the foregoing objects, the present invention has for its objects the provision of an improved mechanism of the kind indicated having a longer service life with more even wear of the moving parts, especially the belts; the provision of such a mechanism wherein the belts may be tensioned uniformly upon installation or upon readjustment as wear does occur; and the provision of a mechanism wherein a smoother transition is effected between normal drive and overdrive of the generator.

The foregoing objects of the invention, and others as may appear hereinafter, are achieved in an automobile generator drive and the like including an automobile generator having a shaft, a counter-shaft parallel to the generator shaft; means mounting said counter-shaft on the generator; a driver mounted on the generator shaft for driving connection with the automobile engine; a first pulley mounted on and having a fixed connection with the generator shaft; a second pulley mounted on the generator shaft, a third pulley mounted on the counter-shaft opposite the second pulley; first belt means drivingly connecting the second and third pulleys; a fourth pulley mounted on the counter-shaft opposite the first pulley; second belt means having a length equal to the length of the first belt means drivingly connecting the first and fourth pulleys, the pulleys and belt means providing a pulley train; means including an over-running clutch and a centrifugal release clutch for alternately engaging the generator shaft with the driver directly or through the pulley train depending on whether the angular speed of the driver is high or low; and means for adjusting the spacing of the counter-shaft from said generator shaft.

More especially, in the construction as generally described in the immediately preceding paragraph, the third pulley has a diameter equal to the diameter of the first pulley and the second pulley has a diameter equal to the diameter of the fourth pulley and greater than the diameter of the first pulley.

In another aspect of the present invention, there is provided an automobile generator drive and the like including: an automobile generator having a shaft; a counter-shaft parallel to the generator shaft; means mounting the counter-shaft on the generator; a driver mounted on the generator shaft for driving connection with the automobile engine; a first pulley mounted on and having a fixed connection with the generator shaft; a second pulley mounted on the generator shaft and having a fixed connection with the driver; an overrunning clutch operatively connecting the driver and the generator shaft; a third pulley mounted on the counter-shaft; first belt means drivingly connecting the second and third pulleys; a fourth pulley mounted on the counter-shaft; second belt means drivingly connecting the first and fourth pulleys; and a centrifugal release clutch operatively connecting the third and fourth pulleys.

In the drawings showing an illustrative form of the invention:

Figure 1:
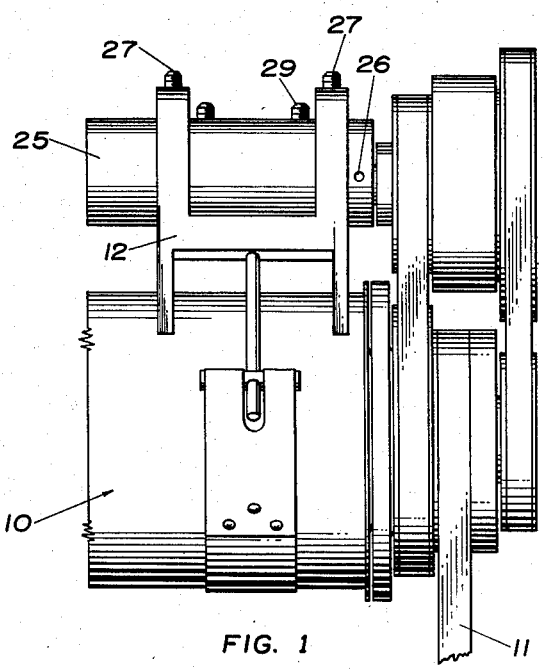
Fig. 1 is an elevational view of an automobile generator equipped with a driving means in accordance with the invention.
Figure 2:
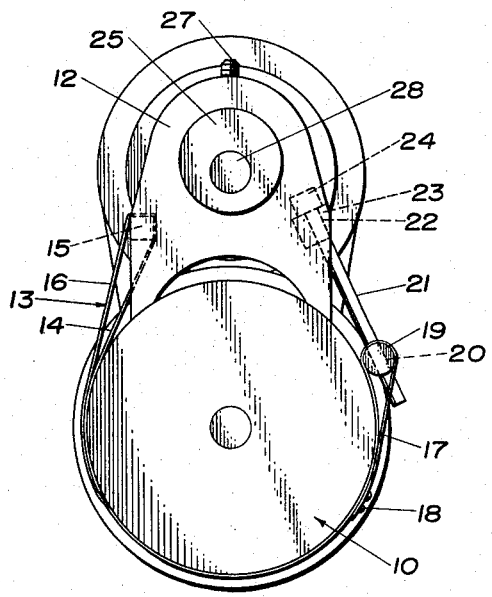
Fig. 2 is a rear view of the assembly shown in Fig. 1.

Referring to the drawings, particularly to Figs. 1 and 2, there is shown a conventional automobile generator 10. As will be understood, the generator is mounted on the automobile engine by brackets (not shown). A generator drive belt 11 drivingly connects the generator to the crank shaft pulley (not shown) of the automobile engine, whereby the generator is driven from the engine.

A saddle mounting bracket 12 is seated on the top of the generator and held securely in position by a metal strap 13. The free end 14 of the strap is looped over the longitudinal bar 15 of the saddle bracket, the free end of the strap being laid against the side of the generator with the standing portion 16 of the strap being laid over the free end and passed underneath the generator case. The head end of the strap has a loop 17 formed therein and fastened by rivets 18. A rod 19 is positioned longitudinally through the eye of the loop and has a transverse threaded hole 20 formed therein. A strap-tightening screw 21 is threaded into the hole 20, the shank of the screw passing through a bore 22 in the longitudinal bar 23 of the saddle bracket. The tightening screw has a head 24 by which the screw may be turned to tighten the strap 13 about the generator case to firmly seat the saddle mounting bracket on the generator.

The saddle mounting bracket 12 is bored longitudinally to receive an outwardly cylindrical hub 25 having a radial hole 26 into which may be fitted a pin wrench (not shown) for rotatingly adjusting the hub in the saddle mounting bracket. When properly adjusted, the hub is fixed in adjusted position by set screws 27.

An eccentric longitudinal bore in the hub 25 receives the rear end of a counter-shaft 28, the counter-shaft being locked in the bore of the hub by set screws 29.

Figure 3:
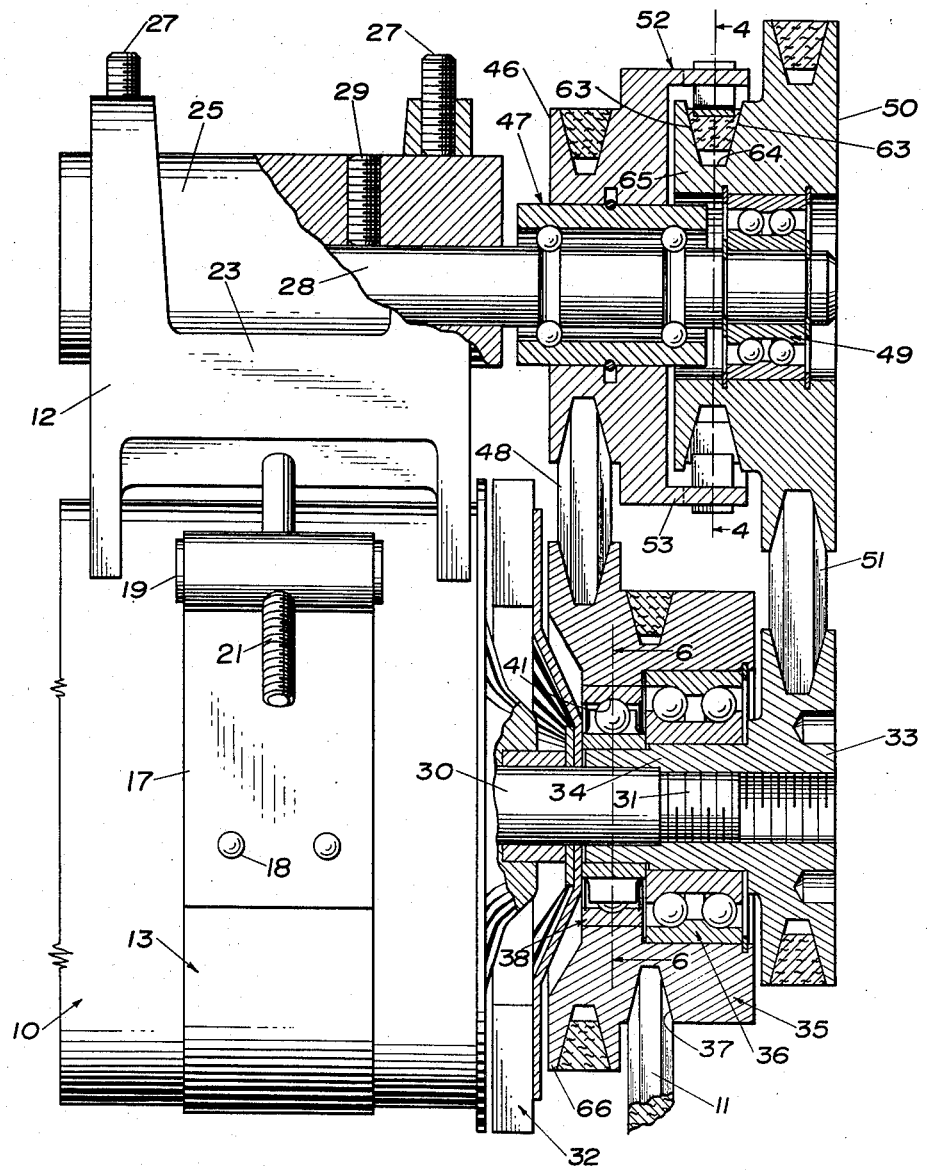
Fig. 3 is an enlarged elevational view similar to Fig. 1, certain parts being shown in section, the section through the centrifugal release clutch being taken along the line 3—3 of Fig. 4 looking in the direction of the arrows.

Referring more particularly to Fig. 3, the generator 10 has a drive shaft 30 provided with a forward end 31 that is threaded. The generator shaft 30 carries the usual generator cooling fin 32 fixed to the shaft for rotation therewith. A first pulley 33 is fixed to the generator shaft by the internally bored and threaded hub 34 that is screwed to the threaded end 31 of the generator shaft.

Rotatingly mounted with respect to the generator drive shaft is a driver and second pulley unit 35. This unit is carried by the ball bearing assembly 36, the inner race of which is fixed to the hub 34 of the first pulley and the outer race of which is fixed to the driver and second pulley unit. The hereinbefore mentioned generator drive belt 11 works in the groove 37 of the driver.

Figure 6:
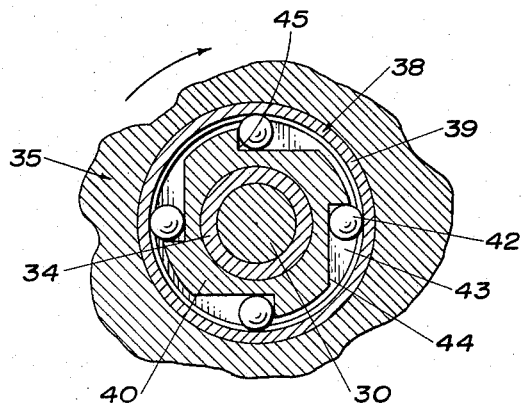
Fig. 6 is a fragmentary sectional view taken along the line 6—6 of Fig. 3 looking in the direction of the arrows.

An over-running clutch 38, seen in transverse section in Fig. 6, is operatively disposed between the second pulley and driver unit 35 and the generator drive shaft 30. The over-running clutch has an outer member 39 fixedly received in a bore in the unit 35 and an inner member 40 fixed to the generator drive shaft 30 by being tightly fitted on the hub 34 of the first pulley. The outer member 39 of the over-running clutch has a medially located peripheral ball groove 41 in which ride the ball clutching elements 42. Four such ball clutching elements are provided in the particular over-running clutch shown. The ball clutching elements are received in tapering pockets 43, the outer walls of which are defined by the groove 41 in the outer clutch member. The inner walls of the pockets are defined by surfaces formed on the inner clutch member 40. One section 44 of the inner pocket wall is disposed at right angles to the shortest radius from the wall section to the center of the clutch. The other wall section 45 is at right angles to the wall section 44. The sections 44 and 45 provide a corner in which a clutch ball 42 can be received, as seen in Fig. 6, with a slight clearance between the ball and groove 41 in the outer clutch member. As will be understood from a consideration of the drawings, when the generator shaft and inner clutch member 40 are rotating faster than the outer clutch member 39 in the clockwise direction, the ball elements 42 are urged into the right angle corners of the pockets and disengaged from the outer clutch member 39 so that the inner clutch member "free wheels" or over-runs the outer member. On the other hand, when the rotational speed in the clockwise direction of the outer member 39 reaches the rotational speed of the inner member 40 and the outer member tries to overtake the inner member, the clutch balls 42 are moved along surfaces 44 toward the narrow ends of the pockets and become wedged between the surfaces 44 and the groove 41 whereby the clutch is engaged and the inner member 40 is driven by the outer member 39.

Rotatably mounted on the counter-shaft 28 is a third pulley 46. A ball bearing unit 47 provides a low friction mounting for the pulley. An endless belt 48 drivingly connects the third pulley 46 to the driver and second pulley 66 of the unit 35 on the generator shaft. Also rotatably mounted on the counter-shaft 28, by means of an anti-friction ball bearing unit 49, is a fourth pulley 50. The latter is drivingly connected by means of a second endless belt 51 to the first pulley 33 that is fixed to the generator shaft.

Figure 4:
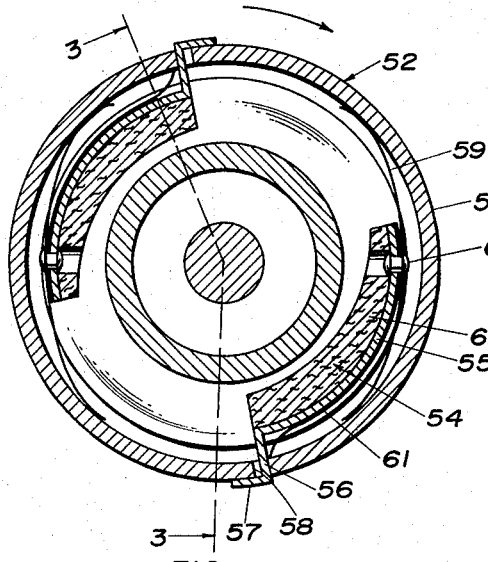
Fig. 4 is a sectional view taken along the line 4—4 of Fig. 3 looking in the direction of the arrows.
Figure 5:
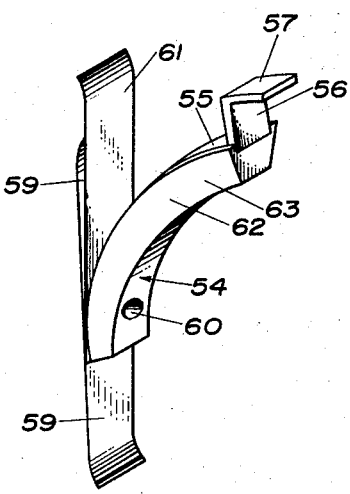
Fig. 5 is an isometric view of a clutch shoe assembly used in the centrifugal release clutch shown in transverse section in Fig. 4.

A centrifugal release clutch, designated by the general reference numeral 52, is operatively disposed between the counter-shaft pulleys. With particular reference to Figs. 3, 4 and 5, the centrifugal release clutch is shown as having an annular clutch housing 53 the radially outer portion of which is formed by a flange integral with the third pulley 46. The clutch housing carries a pair of clutch shoe assemblies 54 on opposite sides of the housing. Each clutch shoe assembly has a circularly arcuate back member 55 terminating at the forward end of the assembly in a mounting bracket having a radial projection 56 and a tangential end portion 57. As seen in Fig. 4, the back member and mounting bracket form a member of Z-shaped cross-section. The radial portion 56 of the mounting bracket is received in an axial slot 58 in the clutch housing 53. Thus, the clutch shoe assembly is fixed to the clutch housing by the mounting bracket and is enabled to rock about the mounting point. Near the free or following end of the assembly, a bow spring 59 is fastened to the back member by a rivet 60. The ends of the bow spring are bent slightly inwardly and act against the inner walls of the housing flange 53 to urge the free end of the clutch shoe assembly inwardly. A leaf spring 61 having an outturned end is also secured to the assembly by the rivet 60. The out-turned end of the leaf spring 61 engages the inner surface of the housing flange 53 and urges the leading end of the assembly inwardly to retain the terminal portion 57 of the mounting bracket snugly against the clutch housing flange 53. A clutch shoe element 62 is bonded to the inner surface of the back member 55. The clutch shoe element provides inwardly converging clutching surfaces 63 that engage the mating walls of a clutch shoe groove 64 formed in the hub 65 of the counter-shaft pulley 50. The clutch shoe tapers from the leading end to the following end thus providing a larger clutching area at the leading end of the shoe than at the following end. It has been found that such tapered shoe configuration provides a smoother clutching action than a shoe which is of uniform radial dimension.

The first pulley 33 on the generator shaft and the third pulley 46 on the counter-shaft have equal pitch diameters. Also, the second pulley 66 of the driver and second pulley unit 35 has a pitch diameter equal to the pitch diameter of the fourth pulley 50 on the counter-shaft. The second and fourth pulleys have larger diameters than the first and third pulleys. Thus is provided a pulley train in which the belts 48 and 51 are of equal length and in which, when the centrifugal release clutch 52 is engaged and the first pulley 33 is driven through the pulley train from the second pulley 66, the speed of the first pulley 33 is stepped up with respect to the speed of the driving pulley 66. The belts 48 and 51, being of equal length, will wear evenly and will stretch to the same extent in use. When it becomes necessary to tighten the belts and the counter-shaft is adjusted in its eccentric mounting for this purpose, both belts will be tightened to the same degree either on initial installation or upon adjustment for maintenance purposes. Long belt life and uniform wear are thus achieved.

In operation, the generator shaft 30, as seen from the front, rotates in the clockwise direction and the several pulleys also rotate in the clockwise direction. When the automobile engine is running at slow speed, the drive mechanism of the invention overdrives the generator at a charging speed. Under these conditions, the drive to the generator shaft is through the pulley train. The second pulley 66 is driven at low speed by the automobile engine through the belt 11. The counter-shaft pulleys 46 and 50 operate as a unit with the centrifugal release clutch engaged and are turned at a greater speed than the driver and second pulley unit 35. The first pulley 33 that is fixed to the generator shaft and is driven from the counter-shaft pulley 50 by the belt 51 is turned at a higher rotational speed than the counter-shaft pulleys to drive the generator shaft at a stepped up velocity with respect to the driver and second pulley unit. Under these conditions, the over-running clutch 38 free wheels, as explained hereinbefore. Thus, even at idling engine speeds, the generator is driven at charging speed.

The centrifugal release clutch 52 is so constructed and arranged, and the force of the bow springs urging the clutch shoes into engagement is so selected, that at a preselected speed ordinarily equivalent to a speed of the automobile engine that will directly drive the generator at a charging rate, centrifugal force will act to throw the clutch shoes out of clutching engagement and to release the centrifugal clutch. At this critical speed and above, the clutch shoes remain out of clutching engagement. Under such conditions, the generator shaft 30 is picked-up through the over-running clutch 38 by the driver and second pulley unit 35 to effect a direct connection between the unit 35 and the generator shaft.

Placement of the centrifugal release clutch between the counter-shaft pulleys provides a drive that is smoother acting and functions in a more positive manner than the generator drive of my aforementioned patent. In my aforementioned patent, the centrifugal release clutch acts between a driver rotatably mounted on the generator shaft and an independent pulley also rotatably mounted on the generator shaft. The clutch shoe is carried by the independently mounted pulley. When the automobile engine reaches the critical point at which the centrifugal release clutch disengages, the speed of the generator shaft exceeds the speed of the driver and the generator shaft must slow down in order that the driver may pick-up, through the over-running clutch, the pulley that is fixed to the generator shaft. Because the pulley train constantly interconnects the pulley that is fixed to the generator shaft with the pulley that is independently rotatably mounted on the shaft, the independently mounted pulley correspondingly decreases its speed, thus reducing centrifugal force acting on the shoe of the centrifugal release clutch and causing the centrifugal release clutch to tend to re-engage. Accordingly, at or about the critical engine speed, the driving means of my prior patent behaves uncertainly; that is, the action tending to engage the over-running clutch after release of the centrifugal release clutch operates to tend to re-engage the centrifugal release clutch. This, of course, urges the generator shaft to rotate at a higher velocity through the pulley train to cause the over-running clutch to free wheel.

This uncertainty of operation is eliminated in the present generator drive. At or above the speed at which the centrifugal release clutch becomes disengaged, the shoes remain disengeged because the clutch housing is constantly driven through the belt 48 by the driver and second pulley unit 35. Hence, the slowing down of the generator to a point where it is picked-up by the over-running clutch in nowise reduces centrifugal force acting on the shoes of the centrifugal release clutch and there is no tendency for the centrifugal release clutch to become re-engaged.

I claim:

1. An automobile generator drive and the like comprising: an automobile generator having a shaft; a counter-shaft parallel to said generator shaft; means mounting said counter-shaft on said generator; a driver rotatably mounted on said generator shaft for driving connection with the automobile engine; a first pulley mounted on and having a fixed connection with said generator shaft; a second pulley mounted on said generator shaft and having a fixed connection with said driver; an over-running clutch operatively connecting said driver and said generator shaft; a third pulley mounted on said counter-shaft; first belt means drivingly connecting said second and third pulleys; a fourth pulley mounted on said counter-shaft; second belt means drivingly connecting said first and fourth pulleys; and a centrifugal release clutch operatively engaging said third and fourth pulleys to each other at a speed of rotation below a preselected critical speed and adapted to release said third and fourth pulleys from engagement with each other at a speed of rotation above said critical speed, said pulleys and belt means providing a pulley train which is adapted, when said centrifugal release clutch is engaged, to drive said first pulley at a faster rotational speed than said second pulley, said over-running clutch being adapted to permit said generator shaft to over-run said driver when said centrifugal release clutch is engaged and turning said generator shaft faster than said driver and to permit said driver to pick up and directly drive said generator shaft when said generator shaft tends to under-run said driver upon disengagement of said centrifugal release clutch.

2. An automobile generator drive as defined in claim 1 wherein said said centrifugal release clutch comprises outwardly facing circumferential clutch face means on said fourth pulley; a clutch shoe carried by said third pulley and engaging said clutch face means, said shoe being adapted to move outwardly under the influence of centrifugal force to a disengaged position; and resilient means urging said clutch shoe into engagement with said clutch face means.

3. An automobile generator drive as defined in claim 1 wherein said third pulley has a diameter equal to the diameter of said first pulley and said second pulley has a diameter equal to the diameter of said fourth pulley and greater than the diameter of said first pulley; and means for adjusting the spacing of said counter-shaft from said generator shaft.

4. An automobile generator drive as defined in claim 1 wherein said centrifugal release clutch comprises outwardly facing circumferential clutch face means on said fourth pulley; a clutch shoe carried by said third pulley and engaging said clutch face means, said shoe being adapted to move outwardly under the influence of centrifugal force to a disengaged position; and resilient means urging said clutch shoe into engagement with said clutch face means; and wherein said third pulley has a diameter equal to the diameter of said first pulley and said second pulley has a diameter equal to the diameter of said fourth pulley and greater than the diameter of said first pulley; and means for adjusting the spacing of said counter-shaft from said generator shaft.

5. An automobile generator drive and the like comprising: an automobile generator having a shaft; a driver rotatably mounted on said generator shaft for driving connection with the automobile engine; an over-running clutch for driving said generator shaft from said driver at the same rotational speed as said driver and in the same direction; and mechanical transmission means for driving said generator shaft from said driver at a faster rotational speed than said driver and in the same direction, said mechanical transmission means including a centrifugal release clutch having a rotatable inner driven member constantly drivingly connected to said generator shaft, said inner member having outwardly facing circumferential clutch face means, a rotatable outer driving member constantly drivingly connected to said driver, a clutch shoe carried by said outer member engaging said clutch face means and adapted to move outwardly to a disengaged position, resilient means urging said clutch shoe into engagement with said clutch face means at speeds below a preselected critical speed and being stressed to permit centrifugal force to move said shoe to said disengaged position at speeds at and above said critical speed, said driver driving said generator shaft through said mechanical transmission means at speeds below said critical speed while said over-running clutch permits said generator shaft to over-run said driver, said driver picking up and driving said generator shaft through said over-running clutch when said centrifugal release clutch is disengaged at or above said critical speed.

References Cited in the file of this patent
UNITED STATES PATENTS

| | | |
|---|---|---|
| 1,983,827 | Winther et al. | Dec. 11, 1934 |
| 2,694,175 | Davis | Nov. 9, 1954 |
| 2,809,535 | Hein et al. | Oct. 15, 1957 |
| 2,860,519 | Cavanaugh | Nov. 18, 1958 |